United States Patent [19]

Trefz et al.

[11] Patent Number: 5,351,467
[45] Date of Patent: Oct. 4, 1994

[54] HEIGHT ADJUSTMENT MECHANISM FOR RIDING MOWER CUTTING DECK

[75] Inventors: Harlin J. Trefz; Robert R. Boyd; Christopher L. Flowers, all of Jackson, Tenn.

[73] Assignee: Noma Outdoor Products, Inc., Jackson, Tenn.

[21] Appl. No.: 97,104

[22] Filed: Jul. 26, 1993

[51] Int. Cl.⁵ .............................. A01D 34/74
[52] U.S. Cl. ....................... 56/16.3; 56/14.9; 56/15.9; 56/17.1; 56/DIG. 22
[58] Field of Search ................... 56/14.7, 14.9, 15.1, 56/15.2, 15.6, 15.8, 17.1, 17.2, 208, 210, 15.9, 16.2, DIG. 22

[56] References Cited

U.S. PATENT DOCUMENTS

| | | | |
|---|---|---|---|
| 2,529,870 | 11/1950 | Golasky | 56/17.2 |
| 2,945,338 | 7/1960 | Burrows et al. | 56/17.2 |
| 3,093,948 | 6/1963 | Root . | |
| 3,114,229 | 12/1963 | Wilson . | |
| 3,269,100 | 8/1966 | Smith . | |
| 3,292,351 | 12/1966 | Larson et al. . | |
| 3,706,186 | 12/1972 | Hurlbert et al. | 56/DIG. 22 X |
| 3,706,188 | 12/1972 | Quiram | 56/15.8 X |
| 4,441,306 | 4/1984 | Kuhn | 56/15.9 |
| 4,577,455 | 3/1986 | Amano et al. | 56/17.1 |
| 4,715,168 | 12/1987 | Oxley . | |
| 4,835,952 | 6/1989 | McLane . | |
| 5,065,568 | 11/1991 | Braun et al. . | |
| 5,085,044 | 2/1992 | Freier, Jr. et al. . | |
| 5,138,825 | 8/1992 | Trefz et al. | 56/DIG. 22 X |
| 5,163,274 | 11/1992 | Burdsall et al. | 56/208 X |
| 5,203,151 | 4/1993 | Mills | 56/17.2 |

FOREIGN PATENT DOCUMENTS 229636 1/1959 Australia .
845169 8/1960 United Kingdom .
2058535 4/1981 United Kingdom .

*Primary Examiner*—Ramon S. Britts
*Assistant Examiner*—James A. Lisehora
*Attorney, Agent, or Firm*—Heiskell, Donelson, Bearman, Adams, Williams & Caldwell

[57] ABSTRACT

Apparatus for suspending, raising and lowering the cutting deck beneath the frame of a riding lawn mower, comprising a pair of lifting arms having first ends rotatably secured to the frame and second ends secured to the cutting deck, rotation of the lifting arms effecting vertical movement of said cutting deck. A pedal operated lifting mechanism is provided, selectively operable by the user of the mower to rotate the lifting arms, thereby raising and/or lower the cutting deck. A suspending member is disposed through an opening in the frame above a portion of one lifting arm, said suspending member having a lower end secured to the lifting arm and an upper end disposed above the opening in the frame. A support member secured to the upper end of the suspending member engages the frame to limit downward movement of the suspending member and lifting arm, and is selectively adjustable by the user to adjust the cutting height of the deck. Upon moving the cutting deck to its upper-most raised position, the suspending member engages the frame adjacent the opening and automatically locks the cutting deck in its raised position. A handle on the suspending member allows the driver to adjust the cutting height with the cutting deck in either its cutting or raised position.

15 Claims, 3 Drawing Sheets

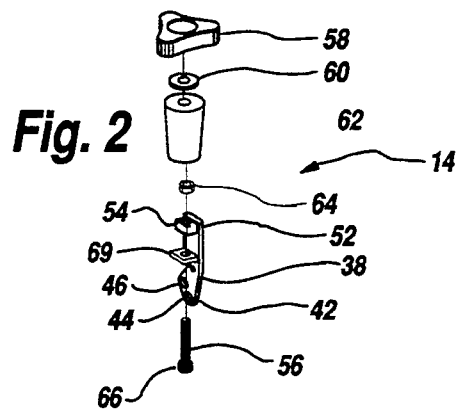
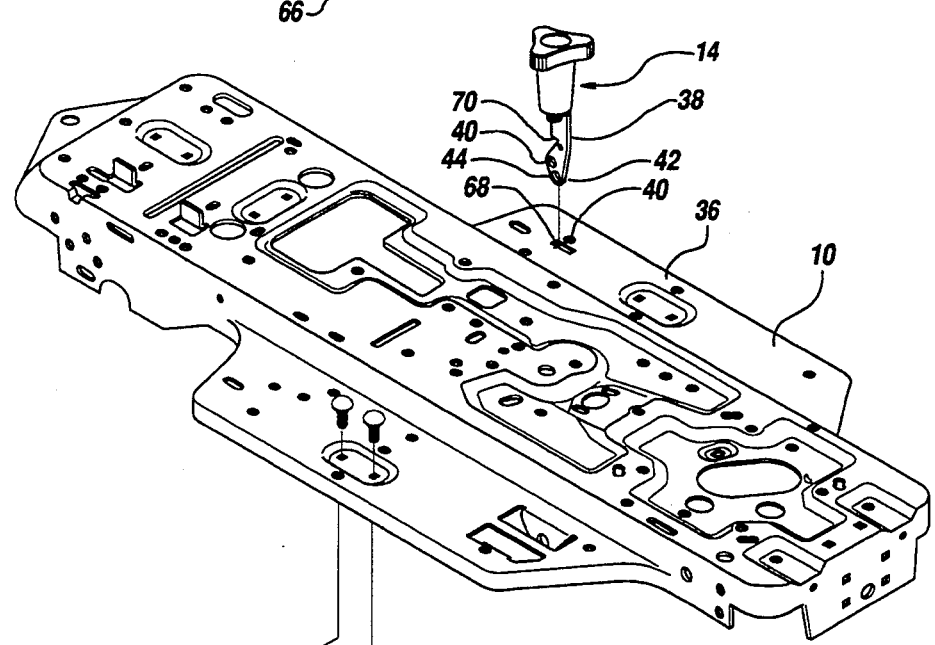
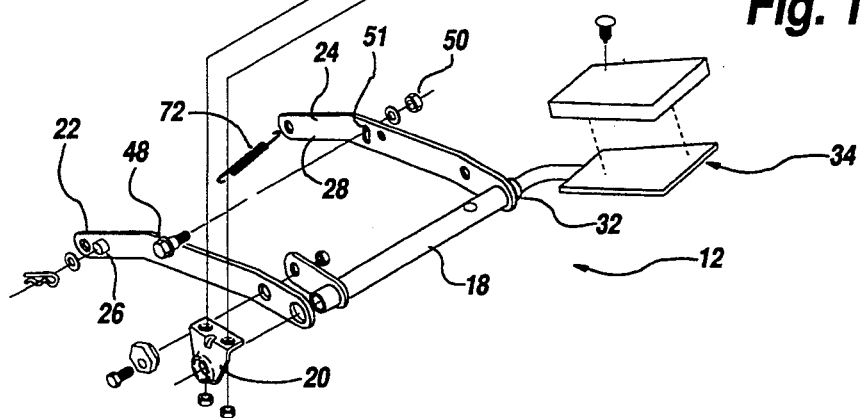

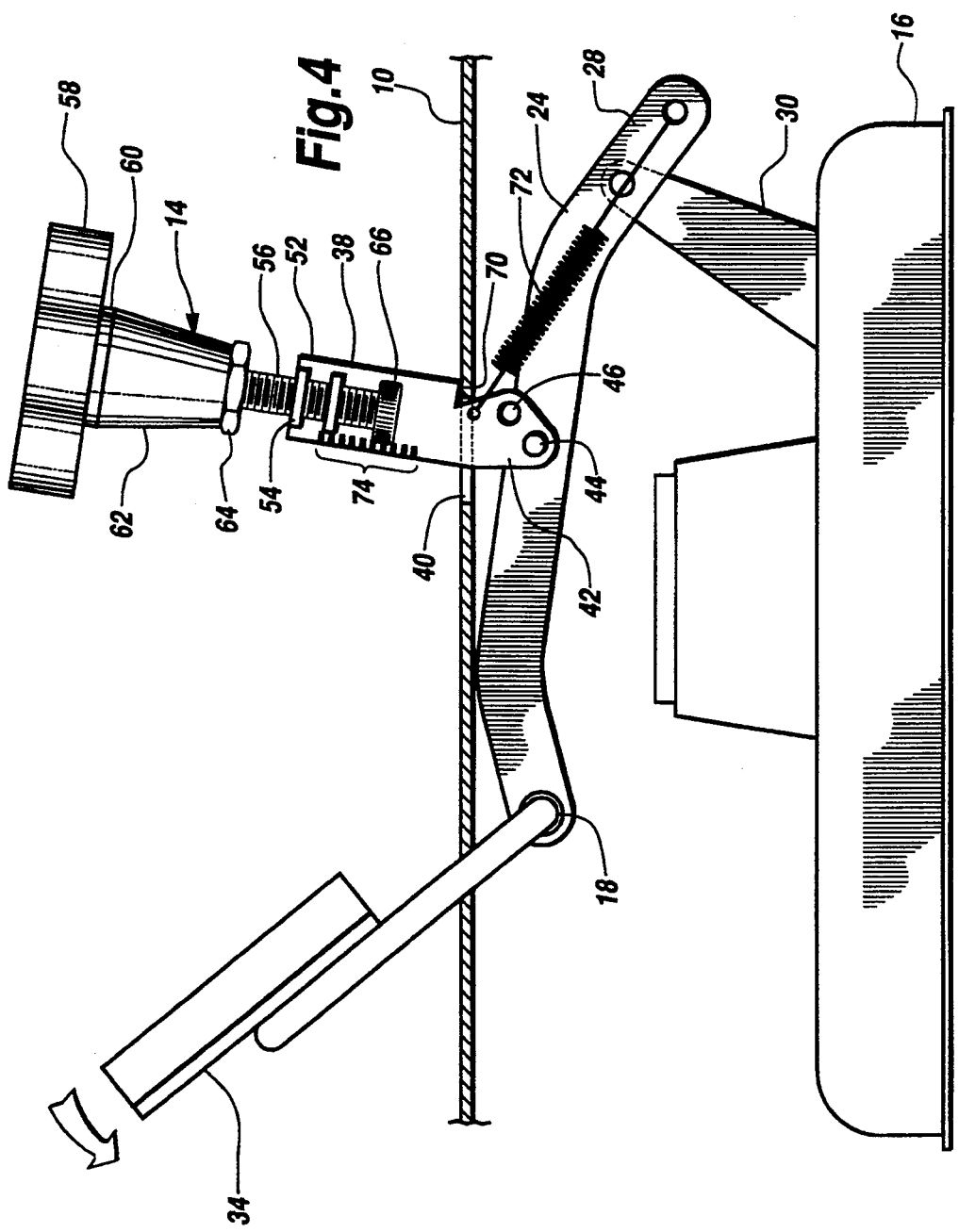

HEIGHT ADJUSTMENT MECHANISM FOR RIDING MOWER CUTTING DECK

BACKGROUND OF THE INVENTION

1. Field

This invention relates generally to riding lawn mowers and, more particularly, to the height adjustment mechanism associated with the apparatus for suspending the cutting deck beneath the mower frame.

2. Description of the Prior Art

For years, hand operated lifting mechanisms were standard equipment for raising and lowering the cutting decks on riding lawn mowers. Such mechanisms typically comprise a relatively long lever projecting upwardly from the foot rest area, having a handle on the upper end to be grasped and pulled by the driver when raising the cutting deck. The cutting height may be established by securing the lever in one of a plurality of slots or notches formed in the foot rest area, or by some other system providing a finite number of discrete settings for the deck height.

In U.S. Pat. No. 5,138,825, issued Aug. 18, 1992, to Trefz, et al., hereby incorporated by reference in its entirety, a pedal operated lifting system is provided for replacing conventional hand operated levers. While the system for suspending and moving the cutting deck shown in the '825 patent represents a significant improvement, the cutting height adjustment mechanism still provides only a finite number of discrete settings. Furthermore, the apparatus for suspending and adjusting the cutting deck includes numerous components which add to the complexity and cost of the mower. Accordingly, a need has been recognized for a suspending apparatus for use on a riding mower having a cutting height adjustment mechanism which provides infinite adjustability, within a range, and which comprises a minimum number of components.

BRIEF SUMMARY OF THE INVENTION

An object of the present invention is to provide a cutting deck height adjustment mechanism which provides virtually unlimited adjustability, within a range established by maximum and minimum heights. A further object is to provide a cutting deck suspending apparatus for use on riding lawn mowers incorporating such an adjustment mechanism.

Another object is to provide a deck height adjustment system comprising a minimum number of relatively inexpensive components.

A still further object is to provide a deck height adjustment mechanism which may be easily manipulated by the driver without the deck being raised to its upper-most position.

An even further object is to provide a cutting height adjustment mechanism which automatically locks the cutting deck in its upper-most raised position.

In accordance with the teachings of the present invention, there is disclosed herein a preferred embodiment of an apparatus for suspending the cutting deck beneath the frame of a riding lawn mower, having an improved cutting deck adjustment mechanism. This invention comprises a lifting arm having a first end rotatably secured to the mower frame, and a second end secured to the cutting deck, wherein rotation of the lifting arm effects vertical movement of the cutting deck, and lifting means selectively operable by the user to rotate the lifting arm, thereby raising and lowering the cutting deck as desired. This invention further comprises a suspending member disposed through an opening formed in the frame above a portion of the lifting arm, said suspending member having a lower end secured to the lifting arm and an upper end disposed above the opening in the frame. A support element is secured to the upper end of the suspending member, and is operative to engage the frame to limit the downward movement of the suspending member and lifting arm secured thereto, thereby establishing the cutting height for the deck. The support element is adapted to allow selective adjustment of the vertical downward movement of the suspending member. In the preferred embodiment, the suspending member includes a notch formed in a side portion thereof for engaging the frame upon moving the cutting deck to its upper-most raised position, thereby securing the deck in said position for travelling. The above stated and other objects of the present invention will become apparent upon reading the following specification taken in conjunction with the appended drawings.

BRIEF DESCRIPTION OF THE DRAWINGS

FIG. 1 is a top exploded perspective view of a suspending and lifting apparatus incorporating the principles of the present invention;

FIG. 2 is an exploded view of the adjustable support element and related components of the present invention;

FIG. 4 is a side schematic view of the apparatus of this invention showing the cutting deck in its fully raised position.

DETAILED DESCRIPTION OF THE PREFERRED EMBODIMENT

Figure 3:
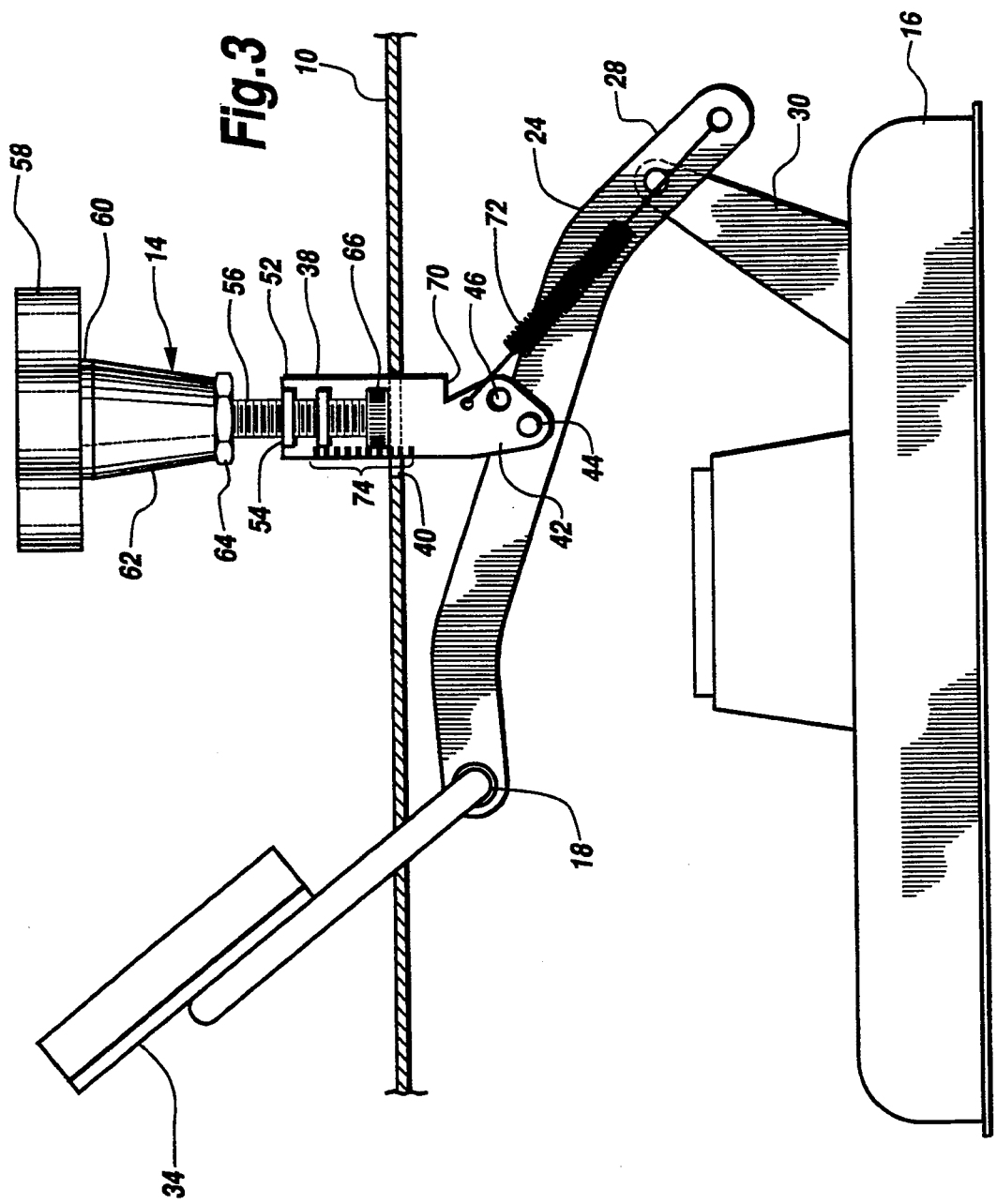
FIG. 3 is a side schematic view of the apparatus of the present invention, shown in a normal cutting position.

With initial reference to FIG. 1, a generally conventional riding lawn mower frame 10 is shown having a vertical lift assembly 12 secured to the underside thereof. While the remaining components of a riding lawn mower are not shown in the appended drawings, it is expected that those skilled in the art will be intimately familiar with the omitted components, all of which are generally conventional.

Lift assembly 12 and adjustable suspending assembly 14, best illustrated in FIG. 2, together comprise an apparatus for suspending cutting deck 16 beneath frame 10. Furthermore, assemblies 12 and 14 cooperate to provide a degree of cutting height adjustability previously unknown in the art, as discussed in more detail below.

Lift assembly 12 comprises a laterally oriented tube 18 rotatably mounted to the underside of frame 10, preferably by a pair of pillow blocks 20 (only one of which is shown herein). Fixedly secured to opposite ends of tube 18 are lifting arms 22 and 24, having distal ends 26 and 28, respectively, hingedly secured to a pair of brackets 30 anchored to cutting deck 16.

Fixedly secured to end 32 of tube 18 is a pedal 34 operable by the driver of the riding mower whose left foot will normally rest on foot rest 36 of frame 10. Depression of pedal 34 rotates tube 18 and lifting arms 22 and 24 counterclockwise, as viewed in FIGS. 3 and 4, thereby raising cutting deck 16. It will be readily appreciated by those skilled in the art that pedal 34 may be replaced by any conventional mechanism for enabling the user to vertically move cutting deck 16 without departing from the principles of the present invention.

Referring now to FIG. 2, suspending assembly 14 is seen comprising a suspending member 38 which, upon complete assembly of the mower, is disposed through opening 40 formed in frame 10. The lower end 42 of suspending member 38 includes a plurality of holes 44 and 46, by which suspending member 38 may be rotatably secured to lifting arm 24, preferably by means of shoulder screw 48 and nut 50. Shoulder screw 48 is secured to lifting arm 24 through hole 51 which is preferably slotted to allow some degree of vertical adjustment for suspending member 38 relative to lifting arm 24, regardless of whether suspending member 38 is attached via hole 44 or hole 46. As shown in FIGS. 3 and 4, hole 44 is used to provide a lower range of cutting heights, as is commonly preferred in most European countries, while hole 46 may be used for a higher range of cutting heights as is commonly preferred in the United States.

The top portion 52 of suspending member 38 has a threaded block 54 rigidly secured thereto for receiving support member 56 which is threadedly engaged therewith. The upper end of support member 56 has a handle 58, washer 60 and sleeve 62 secured thereon by means of nut 64. The lower end of support member 56 comprises an enlarged surface 66 which, with lift assembly 12 in its cutting position shown in FIG. 3, rests on area 68 of frame 10 adjacent opening 40 to support cutting deck 16 at its selected height. In the preferred embodiment shown, threaded block 54 may comprise a square nut welded to top portion 52 of suspending member 38, and support member 56 may comprise a socket head screw. A square rubber washer 69 is relatively tightly disposed on support member 56 to provide friction, thereby avoiding inadvertent turning of support member 56 within threaded block 54 and consequential alteration of the cutting height.

The central portion of suspending member 38 includes a notch 70 formed therein, and is biased rearwardly by means of tension spring 72. Upon depression of pedal 34 sufficient to raise cutting deck 16 to its upper-most position as shown in FIG. 4, suspending member 38 is pulled rearwardly by spring 72 such that notch 70 engages the rear edge of opening 40, thereby securing cutting deck 16 in said raised position. As those skilled in the art will appreciate, this raised position is preferred whenever it is necessary to traverse terrain which is not to be mowed. To return cutting deck 16 to its cutting position, the driver of the lawn mower need only depress pedal 34 slightly to release the pressure on notch 70 and, utilizing handle 58, hold suspending member 38 in its forward position so that notch 70 clears the edge of opening 40 while releasing pedal 34.

Suspending assembly 14 uniquely allows the driver of a lawn mower incorporating the present invention to adjust the cutting height of deck 16 while deck 16 is in its cutting position shown in FIG. 3. With the deck lowered as shown, the driver may rotate handle 58 to raise or lower deck 16, as desired. In the embodiment shown, counterclockwise rotation of handle 58 serves to lower deck 16, while clockwise rotation raises deck 16. It may be preferable to include height indicia 74 on suspending member 38 so the user can readily determine the precise cutting height for deck 16. In the embodiment shown, indicia 74 align with the top edge of opening 40 to indicate the cutting height setting. It is contemplated that, in another embodiment of this invention, sleeve 62 extends over top portion 52 of suspending member 38, with the lower edge of sleeve 62 aligning with the appropriate indicia 74 corresponding to the cutting height.

While the principles of providing an improved lift and suspending assembly for a riding mower have been made clear by the above disclosure, it will be immediately apparent to those skilled in the art that there are many possible modifications to the disclosed arrangement without departing from the basic spirit of the present invention. Accordingly, the following claims are intended to cover and embrace not only the specific embodiment disclosed herein, but also such modifications within the spirit and scope of this invention.

What is claimed is:

1. In a riding lawn mower having a frame and a cutting deck, apparatus for suspending the cutting deck beneath the frame comprising:

a lifting mechanism selectively operable to raise and lower said cutting deck;

at least one lifting arm having a first end operatively engaged with said lifting mechanism and a second end secured to said cutting deck, movement of said at least one lifting arm effecting vertical movement of said cutting deck;

a suspending member disposed through an opening formed in said frame above a portion of said at least one lifting arm, said member having a lower end secured to said at least one lifting arm and an upper end disposed above said opening in said frame, said suspending member being vertically moveable with said at least one lifting arm; and support means adjustably secured to said upper end of said suspending member, operative to engage said frame to limit the downward movement of said suspending member and said lifting arm secured thereto, thereby establishing a cutting height for said cutting deck, said support means being vertically adjustable relative to said suspending member to allow selective adjustment of the vertical downward movement of said suspending member.

2. Suspending apparatus as set forth in claim 1, wherein:

said cutting deck is selectively moveable between a plurality of cutting positions and a fully raised position suitable for travelling; and said suspending member includes means for automatically engaging said frame adjacent said opening when said cutting deck is moved to said raised position, thereby prohibiting downward movement of said suspending member and said cutting deck, said engaging means being selectively disengageable from said frame for allowing said deck to be lowered to a cutting position.

3. Suspending apparatus as set forth in claim 2, wherein said engaging means comprise:

a notch formed in said suspending member, engageable with an edge portion of said opening through said frame upon moving said cutting deck to said fully raised position, and means for biasing said suspending member toward said edge portion so that said notch automatically engages said edge portion upon moving said deck to said fully raised position.

4. Suspending apparatus as set forth in claim 3, wherein:

said biasing means comprise a tension spring having one end secured to said suspending member and an opposite end secured to said at least one lifting arm.

5. Suspending apparatus as set forth in claim 1, wherein:

said top end of said suspending member includes a nut fixedly secured to a side portion thereof; and said support means comprise a threaded element threadingly engaging said nut, having a lower end for engaging said frame upon lowering said cutting deck and an upper end with a handle secured thereto, whereupon rotation of said handle causes translation of said threaded element relative to said suspending member, said translation providing said selective adjustment of said vertical downward movement of said suspending member.

6. Suspending apparatus as set forth in claim 1, wherein:

said at least one lifting arm comprises a pair of spaced apart lifting arms, said first ends thereof being fixedly secured to opposite ends of a laterally oriented tube rotatably secured to said frame.

7. Suspending apparatus as set forth in claim 6, wherein:

said lifting mechanism comprises a pedal fixedly secured to said tube, whereby depression of said pedal by the driver of said riding mower effects rotation of said tube and said lifting arms secured thereto, and consequential raising of said cutting deck.

8. Suspending apparatus as set forth in claim 1, wherein:

said suspending member includes cutting height indicia disposed thereon.

9. Apparatus for suspending a cutting deck beneath the frame of a riding lawn mower and providing for the selective adjustment of the cutting height, said apparatus comprising:

a laterally oriented tube rotatably secured to said frame;

lifting means for selectively rotating said tube;

a pair of spaced apart lifting arms, having first ends fixedly secured to opposite ends of said tube and second ends secured to said cutting deck, whereby rotation of said tube effects vertical movement of said cutting deck;

a suspending member secured to a portion of one of said lifting arms and extending upwardly through an opening formed through said frame, having an upper end disposed above said opening; and a support member attached to said upper end of said suspending member, said support member being operative to engage said frame generally adjacent said opening to limit downward movement of said suspending member, thereby establishing a cutting height for said deck, said support member being vertically adjustable relative to said suspending member to provide selective adjustment of the cutting height for said deck.

10. Suspending apparatus as set forth in claim 9, wherein:

said top end of said suspending member includes a nut fixedly secured to a side portion thereof; and said support member comprises a threaded element threadingly engaging said nut, having a lower end for engaging said frame upon lowering said cutting deck and an upper end, whereupon rotation of said threaded element causes translation thereof relative to said suspending member, said translation providing selective adjustment of said vertical downward movement of said suspending member, thereby providing said selective adjustment of said cutting height for said deck.

11. Suspending apparatus as set forth in claim 10, wherein:

said upper end of said threaded element includes a handle secured thereto to facilitate selective rotation of said threaded element.

12. Suspending apparatus as set forth in claim 9, wherein:

said suspending member includes cutting height indicia disposed thereon.

13. Suspending apparatus as set forth in claim 9, wherein:

said cutting deck is selectively moveable between a plurality of cutting positions and a fully raised position suitable for travelling; and said suspending member includes means for automatically engaging said frame adjacent said opening when said cutting deck is moved to said raised position, thereby prohibiting downward movement of said suspending member and said cutting deck, said engaging means being selectively disengageable from said frame for allowing said deck to be lowered to a cutting position.

14. Suspending apparatus as set forth in claim 13, wherein said engaging means comprise:

a notch formed in said suspending member, engageable with an edge portion of said opening through said frame upon moving said cutting deck to said raised position, and means for biasing said suspending member toward said edge portion so that said notch automatically engages said edge portion upon moving said cutting deck to said raised position.

15. Suspending apparatus as set forth in claim 14, wherein:

said biasing means comprise a tension spring having one end secured to said suspending member and opposite end secured to said lifting arm.

* * * * *